Aug. 27, 1963  R. E. SETTER  3,101,931
PORTABLE BATCH CONCRETE PLANT
Filed April 3, 1961  3 Sheets-Sheet 1

INVENTOR.
RALPH E. SETTER
BY
*John H. Widdowson*
ATTORNEY

Aug. 27, 1963  R. E. SETTER  3,101,931
PORTABLE BATCH CONCRETE PLANT
Filed April 3, 1961  3 Sheets-Sheet 2

INVENTOR.
RALPH E. SETTER
BY
John N. Widdowson
ATTORNEY

Aug. 27, 1963
R. E. SETTER
3,101,931
PORTABLE BATCH CONCRETE PLANT
Filed April 3, 1961
3 Sheets-Sheet 3
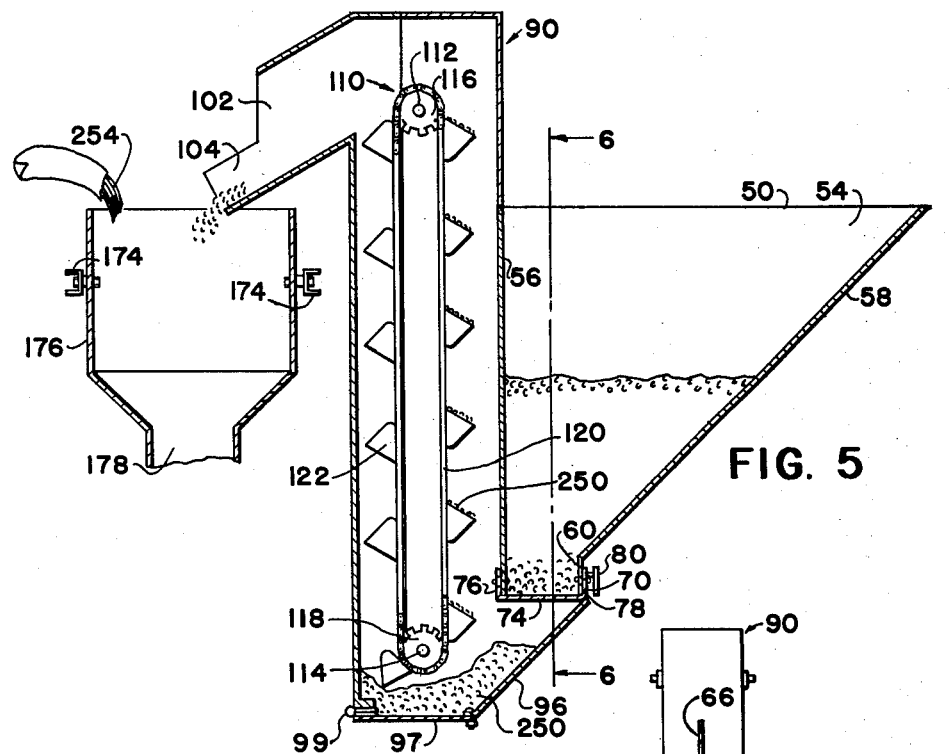
FIG. 5
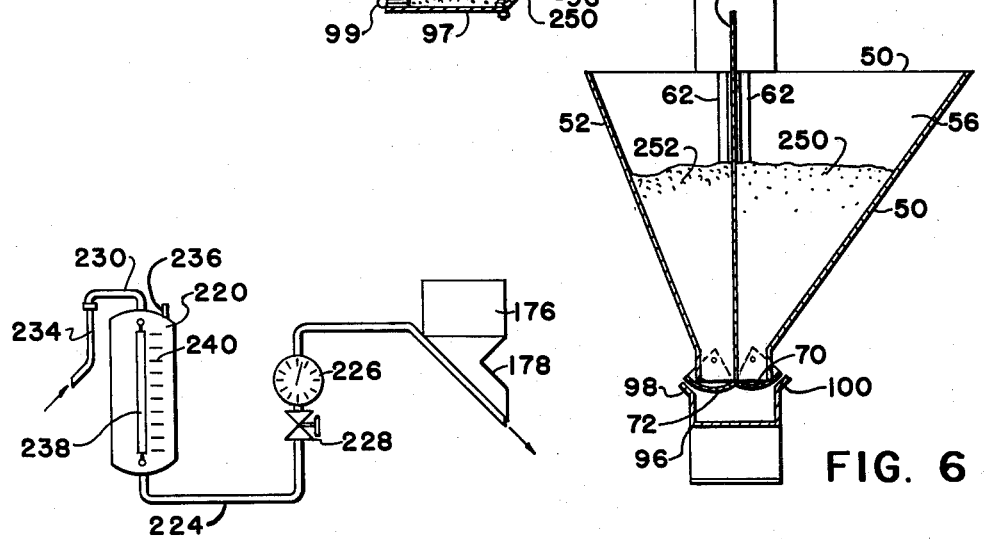
FIG. 6
FIG. 7
INVENTOR.
RALPH E. SETTER
BY
John H. Widdowson
ATTORNEY United States Patent Office 3,101,931
Patented Aug. 27, 1963

3,101,931
PORTABLE BATCH CONCRETE PLANT
Ralph E. Setter, Wichita, Kans., assignor to Universal Pulleys Co., Inc., Wichita, Kans., a corporation of Kansas
Filed Apr. 3, 1961, Ser. No. 100,042
6 Claims. (Cl. 259—154)

This invention relates to a materials handling apparatus. More particularly, this invention relates to an apparatus or plant constructed for handling various types of materials and supplying same in a calculated or predetermined amount to a mixing apparatus. Still more particularly, the invention relates to a batch concrete plant which is portable and which is constructed so that sand, cement, gravel, water, and the like can be supplied in measured amounts to a concrete mixer.

Various types of batch concrete plants and mixers for concrete are known in the prior art. These primarily include structures which are large, bulky and are necessarily permanently installed due to their size and construction. Where such plants are of size and construction to be moved, such movement is intended to be only at infrequent intervals. These batch plants are undesirable for a small contractor and where the batch plant is needed at one building site for a short period and must be readily and quickly movable to another building site with a minimum of effort and expense. Furthermore, the prior art devices which are constructed to be moved must be either disassembled or require special road handling apparatus due to their size, width, weight, etc.

In accordance with the present invention a batch concrete plant is provided. The plant includes frame means. Hopper means are carried by the frame means. Conveyor or elevator means are mounted on the frame means and positioned to receive material from one of the hopper means and direct same to another of the hopper means. Other of the hopper means is operable to discharge material therefrom.

In a preferred specific embodiment, two hopper means are provided with one of same being divided into compartments to receive sand, gravel or other raw material which are moved to the second hopper means in various amounts where cement or the like is supplied and the second hopper means is then emptied into a suitable concrete mixer and mixed with water. Preferably, a water tank is provided with the batch plant and constructed to discharge water therefrom at a known rate so that the volume of water leaving the tank can be measured and such is supplied to a concrete mixer as the second hopper is discharged therein. Means, such as suitable conveyor or elevator means, are preferably provided to move the sand, gravel or the like from the first hopper means to the second hopper means. Means are desirably provided to measure the weights or quantities of materials in the second hopper means, such means to measure the weight of materials preferably being provided by a weight responsive cylinder means with an attached gauge to indicate the weight of the material in the second hopper means. The entire device is preferably mounted on suitable frame means which in turn is carried by wheel means. The frame means is attachable to a pulling vehicle to move the entire device on the road.

Accordingly, it is an object of the invention to provide a new material handling apparatus.

Another object of the invention is to provide a new batch concrete plant which is portable and easily moved without disassembling the plant.

A further object of the invention is to provide a new batch concrete plant which is particularly constructed and adapted for use at the building site and which is portable for easy movement between building sites.

Another object of the invention is to provide an inexpensive and easy to assemble concrete batch plant.

A further object of the invention is to provide a portable concrete batch plant which provides means for supplying all of the necessary materials, including water, to a concrete mixer in measured quantities.

Various other objects, advantages and features of the invention will become apparent to those skilled in the art from the following description taken in connection with the accompanying drawings, in which:

FIG. 5 is an enlarged cross section view through the hoppers and elevator or conveyor means of the plant shown in FIGS. 1–4.

FIG. 6 is an enlarged cross view taken along the line 6—6 of FIG. 5.

FIG. 7 is a diagrammatic view of the water supply system and operation thereof.

Figure 1:
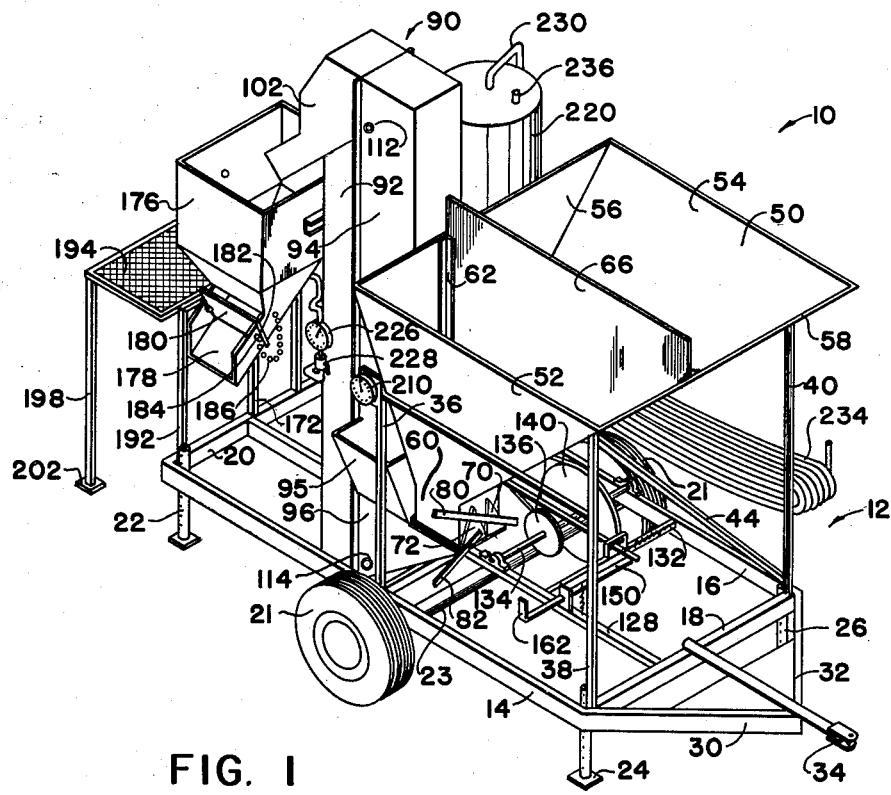
FIG. 1 is an isometric view from one side and end of a preferred specific embodiment of the batch plant of the invention.

The following is a discussion and description of a preferred specific embodiment of the new portable batch concrete plant of the invention, such being made with reference to the drawings whereon the same reference numerals are used to indicate the same or similar parts and/or structure. It is to be understood that such discussion and description is not to unduly limit the scope of the invention.

The portable batch concrete plant of the invention is shown generally at 10 and includes frame means shown generally at 12 which preferably includes two spaced and elongated side members 14 and 16 which are joined by end members 18 and 20 and intermediate frame members as desired to provide additional support, if necessary. Wheels 21 are rotatably mounted on an axle 23 which carries the frame means 12. Feet members 22, 24, 26 and 28 are preferably provided on the frame means 12 and adjustably mounted so as to provide support for the plant when it is in location and operation. Preferably, the feet members 22, 24, 26 and 28 have the shank portion thereof telescopically and vertically adjustably mounted at the corners of the frame means 12 with pin means (not shown) passing through the frame members and the shank portion of the feet so that same can be positioned in any desired vertical position.

Frame means 30 and 32 can be secured to the frame members 14 and 16 and/or the frame member 18 at the front end of the device and hitching means 34 of any suitable construction can be provided and secured to the frame means so that the batch plant can be connected to a pulling vehicle, such as a car, truck or the like, to be easily moved from one location to another.

Four upright frame members or supports 36, 38, 40 and 42 are secured in one end portion to the frame means 12 and extend upwardly therefrom. Suitable cross frame members or braces, as shown at 44 in FIG. 1 can be provided to make the frame means rigid.

Figure 3:
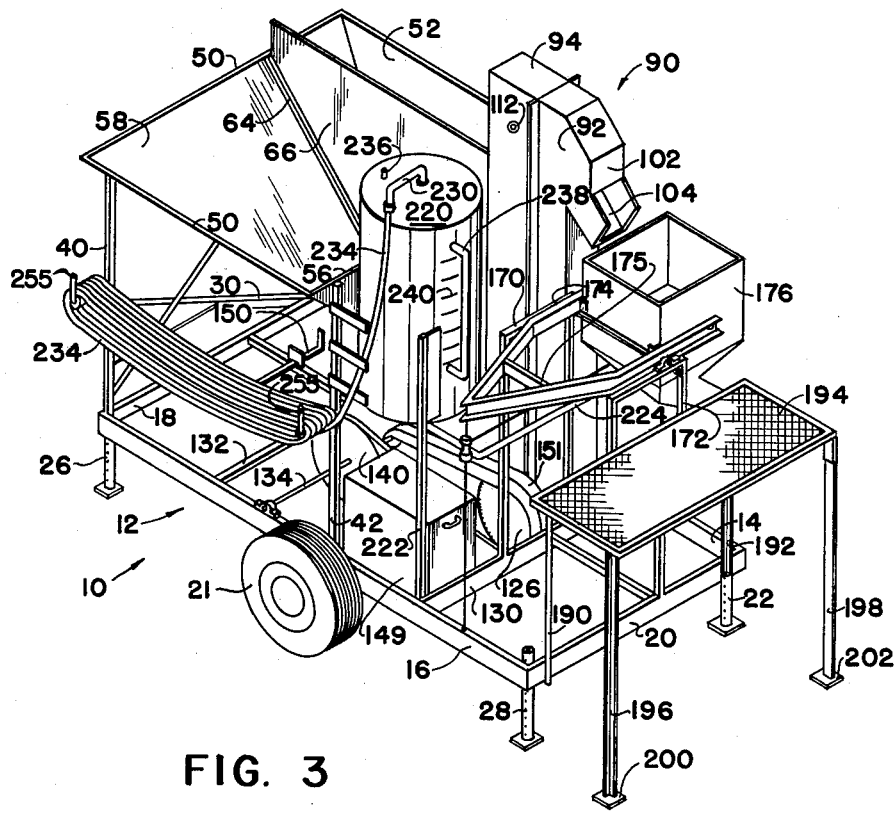
FIG. 3 is an isometric view of the other side and end of the concrete batch plant shown in FIG. 1.

A hopper 50 is secured to the upper end portions of the frame members 36, 38, 40 and 42 and positioned therebetween. The hopper 50 includes side walls 52, 54, 56 and 58 which are secured together in the edge portions thereof in any suitable manner, such as by welding. The side members of hopper 50 taper inwardly to form a narrow neck portion 60 at the bottom thereof. Guide means 62 and 64 can be provided with two of the side members, such as 56 and 58 respectively. These guide members can be formed of common angle irons or the like, two of such being provided to form each of the guide members and mounted in spaced relation. A removable plate 66 can be received between the guide means 62 and 64. Plate 66 is constructed and shaped so as to be positioned in close proximity to the walls 56 and 58 from the neck portion 60 to the open top of the hopper and preferably extends slightly thereabove as shown in FIGS. 1 and 3. The guide means 62 and 64 and plate 66 are preferably positioned so that the two compartments formed thereby are of different sizes, such being desirable since in providing the concrete materials normally more sand is required than gravel. Thus, plate 66 can be positioned so as to divide hopper 50 into compartments, one of which is three-eighths of the volume of the hopper 50 to receive gravel and the other is approximately five-eighths of the volume of the hopper 50 to receive sand. Plate 66 is preferably made removable so that various premixes including sand, gravel and the like can be used and in such instances the plate 66 is removed. Also, while only two compartments are normally desired, additional divider plates and compartments can be provided as desired.

Separate gate means as shown at 70 and 72 are provided in the neck portion 60 of hopper 50 for each of the compartments formed by the divider plates 66. The gate means 70 and 72 can be of any desired construction to permit separate removal of the materials within the compartments of the hopper. The construction of the gate means 70 is best shown in FIG. 5 and includes a bottom plate 74 with two side plates 76 and 78 secured in one end portion to the bottom plate 74 and pivotally secured in the other end portion to the sides 56 and 58 of hopper 50. A handle 80 is provided and positioned to be reached by the operator of the device so that upon movement of the handle 80 the bottom 74 will be moved to permit passage therethrough of the material within the compartment between divider 66 and side wall 54. The gate means 72 can be of a similar construction and can be provided with a handle 82, FIG. 1, to operate the gate means. Other suitable constructions of gate means can be provided, if desired. When the device is constructed for use with pre-mix materials alone and hopper 50 is not divided but receives all of a single type of materials, a single gate means can be provided in neck portion 60. A generally vertically disposed conveyor housing shown generally at 90 is provided and supported by the frame means 12 and can be secured to the side 56 of hopper 50. If desired, side 56 can partially close one side of the housing 90 as shown in FIG. 5. Housing 90 can be formed generally of two side portions 92 and 94 which are positioned adjacent to each other and have flanges thereon through which suitable fastening means (not shown) can be passed to secure the sections 92 and 94 together. This is desirable from a production and operation point of view due to ease of assembly and since access to the interior of the conveyor housing 90 is thus easily obtained.

Section 94 of housing 90 has a boot portion 96 at the lower end portion thereof which is positioned relative to hopper 50 to receive material from the hopper as it passes through neck portion 60 thereof and out gate means 70 and 72. The boot portion 96 of housing 90 is preferably constructed to project from the housing along the lower end thereof as best seen in FIG. 5 and is also desirably formed with lips or flanges 98 and 100 at the sides thereof (FIG. 6) located in close proximity to the gate means 70 and 72 and permit movement thereof. A window or opening can be provided at 95 for visual inspection of the boot portion 96 during operation. The boot portion 96 of housing 90 is provided with a bottom 97 which is preferably hingedly mounted so that the bottom 97 can be lowered to permit cleaning the housing 90. Hinge means 99 are shown for this purpose. Suitable latch means (not shown) keep the bottom 97 in position during operation. Section 92 of conveyor housing 90 preferably has an upper chute portion 102 which projects to one side of the housing 90 and has an outlet 104 therein to permit passage of material therethrough.

Suitable elevator or conveyor means, shown generally at 110 in FIG. 5 is provided and mounted within conveyor housing 90 to lift materials received within the lower end portion thereof upwardly to be discharged through the chute portion 102. The preferred construction of the conveyor means includes conveyor shafts 112 and 114 which are rotatably mounted in the sides of the housing 90 in the upper and lower portions thereof, respectively. Sprockets 116 and 118 are secured to the conveyor shafts 112 and 114, respectively. Endless chain means 120 are received by the sprockets 116 and 118 to turn therewith and with said shafts when same are rotated. A plurality of buckets 122 or the like are secured to the chain means 120 in any suitable manner and are positioned so that they will scoop material from the boot portion 96 of housing 90 into the buckets and lift same to the upper portion of the housing to be discharged through chute portion 102. Centrifugal discharge elevators or conveyors can be used and a tachometer (not shown) can be used therewith to accurately determine the conveyor speed.

Figure 2:
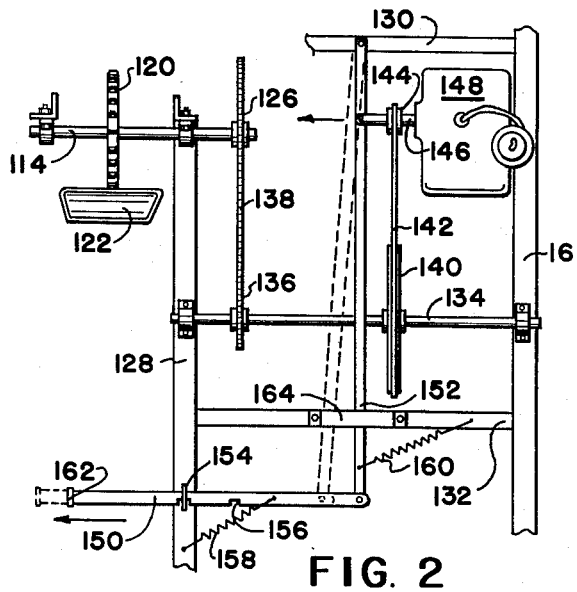
FIG. 2 is a view illustrating the preferred drive means of the batch plant shown in FIG. 1.

Suitable drive means are provided to operate the conveyor means 110. In the preferred embodiment of the drive means shown in FIG. 2 of the drawings, the conveyor drive shaft 114 extends through a wall of the housing 90 and a second sprocket 126 is secured to the projecting end thereof to turn therewith. A frame member 128 is positioned between and is generally parallel to frame members 14 and 16. Frame members 130 and 132 are provided and extend between and are secured to the frame members 16 and 128. A jack shaft 134 is mounted on frame means 16 and 128 for rotation in suitable bearings. A sprocket 136 is secured to the jack shaft 134 to turn therewith and endless chain means 138 or the like are received by the sprocket 126 on conveyor shaft 114 and sprocket 136 on jack shaft 134 so that rotation of the jack shaft 134 is transmitted to the conveyor shaft 114 and then through chain means 120 to the conveyor shaft 112. A pulley 140 is secured to the other end portion of the jack shaft 134 and a belt 142 is received by the pulley 140 and by a pulley 144 on the drive shaft 146 of power means 148. Pulley 144 is preferably a common V-belt clutch. Other types of clutch means can be used, if desired. Power means 148 can be a gasoline driven engine, electric motor or the like depending upon the availability of electric power and intended use and location of the device. A gasoline engine is preferably used. A housing or cover 149 can be provided to enclose power means 148.

An L-shaped member having arm portions 150 and 152 is provided and one end portion of arm member 152 is pivotally secured to support or frame member 130 and the two arm portions are pivotally connected to each other as shown. Arm portion 150 passes through a bracket 154 and is notched as shown at 156 so that the notches can engage the bracket 154 in two positions. Spring means 158 urges the arm member 150 through bracket 154 as shown by the arrows. Spring member 160 urges arm members 150 and 152 in the opposite direction, that is away from bracket 154 to hold clutch 144 into engagement. A handle 162 is provided on the end of arm portion 150 to move the arm members. Another bracket 164 is secured to frame member 132 and limits movement of arm portion 152. Arm portion 152 is operatively connected in an intermediate portion to the V-belt clutch 144 on the shaft 146 so that in operation when handle 162 is moved the clutch mechanism will be engaged or disengaged to operate the drive means. A chain housing 151 is provided over chain means 138 to substantially enclose the working parts of the operating mechanism.

Figure 4:
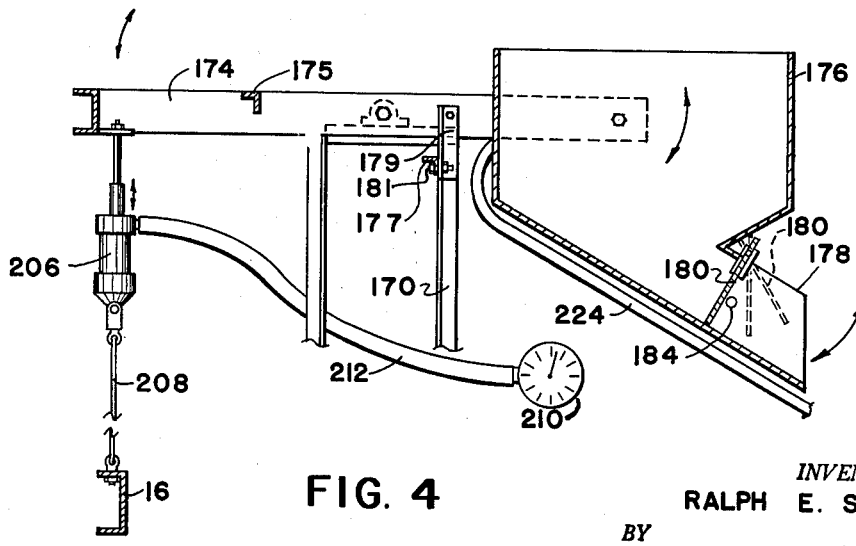
FIG. 4 is a diagrammatic view of one of the hoppers and the weight indicating means of the embodiment of the plant shown in FIGS. 1–3.

A support 170 is rigidly mounted on frame member 130 and a like support 172 is secured to frame member 20 at the rear end of the device. Support or frame members 170 and 172 are preferably generally inverted U-shaped members as best shown in FIGS. 3 and 4.

A generally V-shaped member 174 is provided and the arm portions thereof are pivotally mounted in an intermediate portion on the frame members 170 and 172 by the use of suitable bearings. A brace or support 175 can be positioned between the arm portions of member 174, if desired. The extending arm portions of the member 174 are preferably generally parallel and spaced at the outer ends as best seen in FIG. 3 and they have a second hopper 176 pivotally mounted in the outer end portions thereof, beyond the pivotal mounting of V-shaped member 174 on supports 170 and 172. Hopper 176 is located relative to the conveyor housing 90 so that the chute means 102 and outlet 104 thereof is located above the open top of the hopper 176 so that material lifted by the conveyor or elevator means 110 will be discharged through chute 102 into hopper 176.

Hopper 176 is shaped in the lower portion thereof to form an outlet chute 178 which preferably projects to one side of the batch plant as best shown in FIG. 1. A gate member 180 is pivotally mounted on the side of the chute portion 178 and has handle means 182 therewith to move same to close or open the chute 178. A gate locking pin 184 can be provided and pass through one or both sides of the chute portion 178 to position the gate 180 in the closed postion and suitable connecting means, such as a chain or the like 186, can be provided and secured in its end portion to the hopper 176 and gate locking pin 184 to prevent losing the locking pin when not in use.

Two leg members 190 and 192 are secured to the frame member 20 in one end portion and a platform 194 is pivotally mounted in one side portion on the upper end portion of the leg members 190 and 192. Two additional legs 196 and 198 are pivotally mounted in their upper end portions to the other side of platform 194 and they have feet 200 and 202 respectively secured to the lower end portion thereof. Legs 196 and 198 are longer than legs 190 and 192 as best seen in FIG. 3 so that when the feet are engaged with the ground the platform 194 will be level and a worker can be positioned thereon to charge the hopper 176 with cement or other materials. If desired, legs 196 and 198 and/or legs 190 and 192 can be height adjustable to vary the height of the platform 194. The construction of platform 194 permits it to be moved to a vertical position beside hopper 176 during road movement.

Means are preferably provided to determine the amount of material in the hopper 176 during any stage of the batch preparation. In the preferred embodiment member 174 has a weight responsive cylinder 206 secured to the portion of the member where the two arm portions meet. Weight responsive cylinder 206 is rigidly secured to member 174 in one end portion and is connected in the other end to one of the frame members, such as member 16 by a flexible cord, wire or the like 208. A weight indicating gauge 210 is provided with the cylinder 206 and connected thereto by a hose or line 212. The gauge is preferably located near the outlet of hopper 176 as shown in FIG. 1. Thus, as material flows from hopper 50 is moved by elevator or conveyor means 110 to chute 102 of housing 90 and into hopper 176, the cylinder 206 will be urged upwardly by the downward force or weight in the hopper 176 and gauge 210 will give the total weight of materials in hopper 176.

A water tank 220 is preferably provided and can be mounted on frame member 42 and a frame member 222, or otherwise suitably supported. Preferably, the bottom of the tank 220 is located relative to the outlet chute 178 of hopper 176 so that water can flow from the bottom of the tank by gravity. A water conduit 224 is connected in one end portion to the bottom of tank 220 and desirably secured in the other end portion to the bottom of hopper 176 with the end projecting slightly beyond the end of the chute portion 178. A meter 226 and suitable valve means 228 can be provided intermediate the ends of conduit 224 so that water from the tank 220 can be furnished in measured amounts and the gauge 226 will read total volume of water delivered. An inlet 230 is provided at the top of the tank 220 and suitable hose means 234 can be connected to inlet 230 in one end portion and to a source of water under pressure in the other end portion. Hose 234 can be connected to a city water conduit or pump means can be provided with the unit to provide water to tank 220 from a well, lake, river or the like.

An air valve 236 can be provided in the top of tank 220 to be opened or closed in order to retain the desired amount of air in the tank 220 and thus the amount of pressure on the water leaving the tank by means of conduit 224. A sight gauge 238 can be provided on the side of the tank 220 and suitable calibrations 240 can be marked on the tank or gauge. By use of the sight gauge 238 and air bleeder valve 236 a relatively simple means can be provided to maintain constant water pressure at the outlet of tank 220. Thus, with air bleeder valve 236 open water from hose 234 is provided to the tank 220 until the water level reaches a predetermined level as shown by gauge 238. Air bleeder valve 236 is then closed and water under pressure is again provided to the tank 220 through hose 234. This will compress air in the top portion of the tank and when the air pressure reaches the fluid pressure no more fluid will flow into the tank 220. As valve means 228 is opened and water is drawn from the tank the air pressure within the tank will be reduced and water will again flow into the tank. This simple and unique structure is very desirable in a commercial type device and permits delivery of water at a substantially constant rate and pressure.

In operation, sand 250 and gravel 252 or a premix of sand and gravel is provided to hopper 50 and, when separate materials are used, same are placed in the compartments on each side of divider plate 66. The material can be loaded in any suitable manner, such as by using tractors having front lift attachments, conveyor means, or the like. Handle 162 is then adjusted to transmit the drive from engine 148 to jack shaft 134 through belt 142 and this rotary motion is transferred through chain means 138 to the drive shaft 114 of the conveyor means 110. The gate means 70 and 72 of hopper 50 are then individually operated to provide sand and then gravel or the reverse thereof to the boot portion 96 of the conveyor housing 90. As the material passes into the conveyor housing 90 the moving buckets 122 will receive and lift same upwardly through the housing 90 and the centrifugal force obtained as the buckets move around shaft 112 will cause material therein to be discharged into chute portion 102 of housing 90 and pass through the outlet 104 thereof into hopper 176. As the materials 250 and 252 are individually supplied to hopper 176 the gauge 210 with cylinder 206 will indicate the total weight of material supplied to the hopper. Thus, when the desired weight of one material has been supplied the gate to that portion of the hopper 50 will be closed and the other gate opened causing the other material to be furnished thereto until the total weight then reaches the desired amount. A worker on platform 194 can then supply cement 254 from bags into hopper 176 or the cement can be supplied from a bulk tank by flight conveyor means or the like. The desired weight of cement can be accurately supplied by virtue of the weight responsive gauge 210. With the desired amounts and types of materials in hopper 176, gate 180 is then opened by removing the gate locking pin 184 and moving handle 182. Material in hopper 176 will then be discharged therefrom and charged into a suitable concrete mixing apparatus (not shown). Water from hose 224 can be supplied to the concrete mixer, either simultaneously with the other materials or separately, by operation of valve member 228. The total volume of water supplied will be accurately determined by the readings of the gauge 226. With hopper 176 thus emptied, sand and/or gravel from hopper 50 can again be moved to hopper 176 by the conveyor means 110 and the entire process can again be repeated.

To prepare the device for road movement after it has been used, the platform 194 is pivoted about legs 190 and 192 and the legs 196 and 198 will pivot about the other side of the platform and the platform can be held in position by any suitable means (not shown). The water hose 234 to inlet 230 of tank 220 is then wrapped around the hanger members 255 on supports or frame members 40 and 42. The weight responsive cylinder 206 is preferably relieved of the weight of the hopper 176 during road travel since the relatively heavy weight of the hopper 176 and associated structure may cause damage to the cylinder during movement.

The preferred manner of relieving weight responsive cylinder 206 is best shown in FIGS. 3 and 4 of the drawings. Here, an angle iron or the like 177 is secured in the ends to frame members 170 and 172 and positioned on the same side of the pivotal mounting of the V-shaped member 174 as the hopper 176. A short piece of angle iron or the like 179 is provided and is secured in one end portion to one of the arms of the V-shaped member 174 and located relative to angle iron 177 so that the other end portion thereof can be positioned adjacent to the angle iron 177. The members 177 and 179 are apertured and suitable bolt means or the like 181 can be passed therethrough to rigidly secure the arm member 174 relative to frame member 170. This, of course, will prevent any movement of the hopper 176 or the member 174 and thus relieve the weight responsive cylinder 206. Other suitable means can be provided to relieve the weight responsive cylinder 206. For example, a suitable rigid or flexible member can be provided between one of the frame members, such as frame member 16, and the V-shaped member 174 for periods of travel.

With the V-shaped member 174 and hopper 176 thus rigidly secured relative to each other for road movement, the legs 22, 24, 26 and 28 can be elevated and locked in position by suitable bolt means (not shown) passing through the frame members and apertures in the leg members. This, of course, is done after the hitching means 34 is secured to a suitable pulling vehicle. The plant is then ready for road travel and can be easily moved by a vehicle to another location and quickly set up for operation on a temporary or semi-permanent basis merely by extending the legs, moving the platform to operating position, releasing the means to relieve the weight responsive cylinder 206 and connecting the hose 234 to a suitable source of water. This can be done in a short period of time and makes the apparatus particularly suitable for small jobs where present day equipment is not practical.

While the invention has been described in connection with a preferred specific embodiment thereof, it will be understood that this description is intended to illustrate and not to limit the scope of the invention, which is defined by the claims.

What is claimed is:

1. A portable batch concrete plant comprising, in combination, elongated and generally rectangular frame means mounted for movement on wheel means, four feet telescopically and adjustably mounted at the corners of said frame means, hitching means secured to an end portion of said frame means for connecting said plant to a pulling vehicle, four upright frame members secured in spaced relation to said one end portion of said frame means, a first hopper secured to and positioned between said upright frame members, said hopper being open at the top and tapered to a narrow neck portion at the bottom thereof, a removable plate extending from said top to said neck portion and separating said hopper into two compartments of different sizes, separate gate means in said neck portion of said hopper for each of said compartments to permit passage of material therethrough, a vertically disposed conveyor housing secured to one side of said hopper and to said frame means, said housing having a lower boot portion positioned to receive material from said hopper and an upper chute portion, the bottom of said boot portion being hingedly mounted to permit emptying of said housing, conveyor means in said housing including two conveyor shafts mounted for rotation in the sides of said conveyor housing, one of said shafts being mounted in the lower end portion of said housing with one end thereof extending through said housing and the other of said shafts being mounted in the upper end portion of said housing, sprockets secured to said shafts to turn therewith, endless chain means received by said sprockets to turn therewith, a plurality of buckets carried by said chain means, another sprocket secured to said one end of said shafts, an engine secured to said frame means, a jack shaft rotatably mounted on said frame means, a sprocket mounted on said jack shaft, chain means connecting said sprocket on said jack shaft with said last-named sprocket on said one of said shafts, a pulley on said jack shaft, belt means connecting said pulley with the drive shaft of said motor so that upon operation of said engine said jack shaft will be rotated to turn said one of said shafts to drive said conveyor means, spaced, upwardly extending supports carried by said other end portion of said frame means between the sides thereof, a generally V-shaped member pivotally mounted in an intermediate portion on said supports and positioned therebetween, the end portions of the arms of said V-shaped member being generally parallel, a second hopper positioned between and pivotally secured to said end portions of said arms of said V-shaped member on one side of the pivotal mounting of said V-shaped member on said supports, said second hopper being shaped in the lower portion thereof to form an outlet chute, a pivotally mounted gate mounted and operable to close said chute of said second hopper, a gate locking pin carried by said second conveyor and positionable in said chute to maintain said gate in the closed position, two leg members secured to said other end portion of said frame means, a platform pivotally mounted in one side portion on said leg members, two pivotally mounted legs secured to the other side portion of said platform and engageable with the ground in operation, a weight responsive cylinder having one end thereof connected to the other end portion of said V-shaped member and to the other side of the pivotal mounting of said V-shaped member on said supports, a flexible wire connecting the other end portion of said cylinder to said frame means, a weight indicating gauge with said cylinder to indicate the weight of materials in said second hopper, cooperating lock out means with said supports and said V-shaped member to relieve said cylinder of the weight of said second hopper during road movement of said plant, a water tank carried by said frame means and mounted with the bottom of said tank above the lower end of said outlet chute, a water conduit connected in one end to an outlet in said bottom of said tank and secured to the bottom surface of said chute of said second conveyor with the other end of said conduit at the end of said chute, said plant being constructed and adapted so that in operation sand and gravel can be placed in said compartments of said first hopper and discharged therefrom in controlled quantities through said gate means in said neck portion thereof and lifted by said conveyor means and delivered through said chute portion of said conveyor housing into said second hopper with said cylinder and gauge indicating the weight of material delivered, and cement can be placed in said second hopper by a worker on said platform until the desired amount of materials are in said second hopper whereupon said gate in said chute of said second hopper can be opened to deliver said sand, gravel and cement to a concrete mixer and water from said tank can be supplied through said conduit to said mixer.

2. A portable batch concrete plant comprising, in combination, frame means mounted for movement on wheel means, feet adjustably mounted on said frame means and engageable with the ground to support said frame means in operation, hitching means secured in an end portion of said frame means to connect same to a pulling vehicle, a first hopper carried to said frame means, said hopper being open at the top and tapered to a narrow neck portion at the bottom thereof, guide means on two sides of said hopper, a removable plate positionable in said guide means and extending from said top to said neck portion to separate said hopper into compartments, gate means in said neck portion of said hopper to permit passage of material therethrough from said compartments, a conveyor housing carried by said frame means and positioned adjacent said first hopper with the lower end portion thereof extending beneath and positioned to receive material from said neck portion of said hopper when said gate means thereof is open, said housing having an upper chute portion formed thereon and extending to one side thereof, conveyor means mounted in said housing and constructed and adapted to receive material from said first hopper and lift same in said housing and discharge same through said chute portion of said housing, power means carried by said frame means and operatively connected to said conveyor means to operate same, supports carried by said frame means, a generally V-shaped member pivotally mounted in an intermediate portion on said supports, a second hopper positioned between and pivotally secured to the end portions of said arms of said V-shaped member to one side of the pivotal mounting of said V-shaped member and located to receive material from said chute portion of said conveyor housing, gate means operable to close the outlet portion of said second hopper, a platform carried by said frame means and positionable relative to said second hopper so that a worker on said platform can load said second hopper, a weight responsive cylinder connected to the other end portion of said V-shaped member and to said frame means, a weight indicating gauge with said cylinder to indicate the weight of materials in said second hopper, a water tank carried by said frame means and having an outlet in the bottom thereof, conduit means secured to said outlet of said water tank, said plant being constructed and adapted so that in operation sand and gravel can be placed in said first hopper and discharged therefrom through said gate means in said neck portion thereof to be received by said conveyor means and lifted through said conveyor housing and discharged therefrom through said chute portion thereof to be received by said second hopper together with cement, said cylinder and said gauge indicating the weight of materials delivered to said second hopper, and said gate means in said second hopper can be opened to discharge said materials therefrom and charge a concrete mixer, water from said tank being supplied to said concrete mixer through said conduit means.

3. A portable batch concrete plant comprising, in combination, frame means mounted for movement on wheel means, hitching means secured to said frame means to secure said plant to a pulling vehicle, a first hopper carried by said frame means, said hopper being open at the top and having a narrow neck portion at the bottom thereof, gate means in said neck portion of said hopper to permit passage of material therethrough, a conveyor housing mounted on said frame means, said housing having a lower portion positionable to receive material from said hopper and an upper chute portion, conveyor means in said housing operable to receive material from said hopper and lift same through said housing and discharge same through said chute portion of said housing, power means carried by said frame means and operatively connected to said conveyor means to operate same, support means mounted on said frame means, a pivotally mounted second hopper with said support means and positioned to receive material from said chute of said conveyor means, means with said second hopper to indicate the amount of material therein, a water tank supported by said frame means, a water conduit connected in one end portion to said second hopper and connected in the other end portion to said water tank, gate means with said second hopper operable to maintain material therein and to release same therefrom, said plant being constructed and adapted so that material from said first hopper can be lifted by said conveyor means and discharged through said chute portion of said conveyor housing into said second hopper to be received therein and said gate means of said second hopper can be opened to discharge material therefrom into a concrete mixer as water is supplied through said conduit to said concrete mixer.

4. A portable batch concrete plant comprising, in combination, frame means mounted on wheel means for road movement, two separate hoppers carried by said frame means, conveyor means supported by said frame means and positioned to receive material from one of said hoppers and convey same to the other of said hoppers, said other of said hoppers having gate means operable to close or open the outlet thereof, water storage means mounted on said frame means, a water conduit connected in one end portion to said water storage means, and means operatively connected to said other of said hoppers to determine the amount of material therein, said plant being constructed and adapted so that material from said one of said hoppers can be conveyed to said other of said hoppers in a measured amount and discharged therefrom with water from said conduit.

5. The device as recited in claim 4 wherein said one of said hoppers has removable means therein dividing said one of said hoppers into two compartments to receive different materials therein, and said one of said hoppers is provided with separate gate means for each of said compartments whereby materials from first one of said compartments and then the other of said compartments can be provided to said conveyor means and said other one of said hoppers.

6. A portable batch plant comprising, in combination, frame means having ground engaging means operatively connected thereto to mount said frame means for road movement, two hoppers mounted on said frame means and having gate means therewith to regulate the flow of material therefrom, elevator means mounted on said frame means and positioned relative to said hoppers to receive material discharged from one of said hoppers and elevate same and discharge same into the other of said hoppers, water storage means carried by said frame means and having an outlet therewith, conduit means operatively connected in one end portion to said outlet of said water storage means to receive water therefrom and having the other end portion thereof positioned adjacent said gate means of said other of said hoppers, said batch plant being constructed and adapted to receive concrete mixing materials in said hoppers with material from said one of said hoppers being transferred to said other of said hoppers for discharge therefrom into concrete mixing apparatus or the like and with water from said water storage means being supplied through said conduit means to said concrete mixing apparatus.

References Cited in the file of this patent

UNITED STATES PATENTS

| | | |
|---|---|---|
| 1,775,745 | Yett | Sept. 16, 1930 |
| 2,138,172 | Johnson | Nov. 29, 1938 |
| 2,741,401 | Kehus et al. | Apr. 10, 1956 |